Dec. 21, 1937.  H. R. LEWIS  2,102,961
PULPING MACHINE
Filed Sept. 22, 1934  2 Sheets-Sheet 2

Patented Dec. 21, 1937

2,102,961

UNITED STATES PATENT OFFICE 2,102,961

PULPING MACHINE

Harold R. Lewis, Baltimore, Md., assignor to Food Machinery Corporation, San Jose, Calif., a corporation of Delaware Application September 22, 1934, Serial No. 745,115

2 Claims. (Cl. 146—174)

This invention relates to an apparatus for pulping fruits and vegetables and extracting the juices therefrom, and has for its general objects to increase the production capacity compared with that of prior machines; to effect an increase in the amount of juice extracted per unit of material handled and to provide a machine of simple construction and more efficient in operation.

The particular improvement relates to the shape of the beater paddles and their more efficient manner in handling and expressing the juices from the material.

In common with machines of this class the beater blades are mounted upon spiders that are in turn mounted upon horizontally disposed shafts extending longitudinally through the machines and move coincident therewith as the shafts revolve. The beater blades are radially adjustable relative to the shafts and rotate within a screened drum, the edges of the blades moving close to the inner periphery thereof so as to engage and squeeze the pulpy material against and through the openings in the drum thereby extracting the juice and very finely divided pulp.

The faces of the beater blades have heretofore been set radially from the center of rotation so that the mass of pulpy material was pushed around the inside of the screened drum and only that material that was squeezed between the edges of the beater blades and the inner periphery of the drum had the juice properly extracted therefrom, and it has been found that considerable of the material was finally discharged from the drum without ever having come in contact with the inner surface thereof, so that the juice carried by this material was lost for the particular product being produced.

The center of rotation of the blades relative to the axis of the drum have been made eccentric so that as the material was moved around toward the bottom surface of the drum it received an added squeezing effect which has been an advantage, but even after this there has still remained some juice in the discharged material.

The improvement of this application, which has been applied to the machine of my co-pending application Serial No. 710,781, consists in rounding the surfaces of the beater blades so that all material contacted will be squeezed down against the drum instead of being simply pushed around inside the drum. This improved construction adds very much to the efficiency of the machine and increases the juice extraction very materially.

The improved shape of the beater blades insures that every bit of material passing through the machine will be squeezed and rubbed against the inner wall of the screen so that all of the juice, within practical limits, and the pulp will be squeezed through the screen, and none of the material be simply pushed around out of contact with the screen.

It has also been found that the discharge of the dross material is much better effected by staggering the ends of the beater blades at the discharge end which seems to more or less break up the discharging mass and eject it more uniformly which is an advantage over having it ejected in lumps.

Reference now being had to the drawings a better and clearer understanding of the invention will be had.

Figure 2:
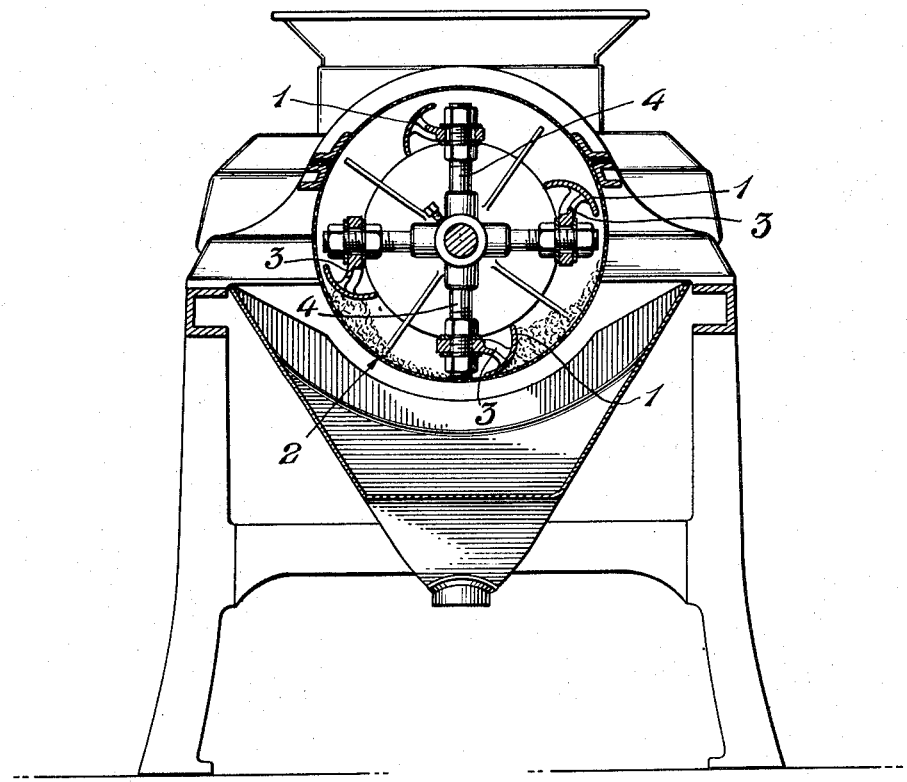
Figure 2 is a vertical cross sectional elevation taken on substantially the line 2—2 of Figure 1.

Figure 2 gives the best view of the improved beater blades which are designated by the numeral 1 and are seen to be arcuate in shape, the outer edge of the arc riding close to the inner surface of the screen drum 2, and on account of the eccentric mounting relative to the axis of the drum they ride closer to the bottom side of the drum than the top, so that as they revolve there is a gradual squeezing action in a radial direction as well as a squeezing action circumferentially due to the arcuate blades.

The beater blades rotate at a comparatively high speed so that there is more or less centrifugal action exerted on the mass of material as it is carried around by the blades which facilitates the squeezing action of the arcuate surfaces of the blades and thereby is effected a much greater extraction of the juices and fine pulp of the material being handled.

The arcuate beater blades have lugs 3 cast integral therewith with slotted holes to fit over the spider studs 4 and with lock nuts providing radial adjustment as well as spiral adjustment to vary the angular sweep of the blades so as to gradually force the dross matter toward the discharge end of the machine.

Figure 1:
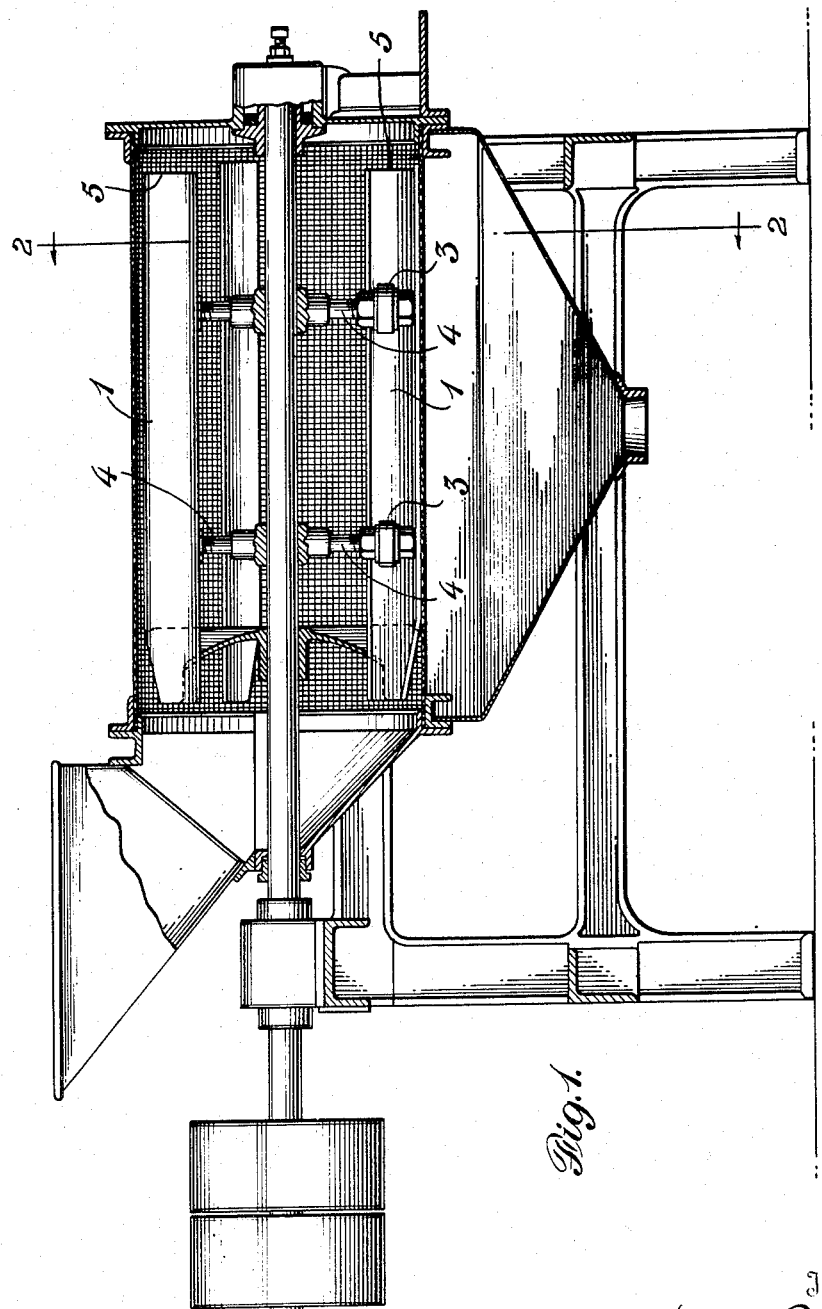
Figure 1 is a vertical sectional elevation of a machine embodying the invention.

By reference to Figure 1 it will be seen that the discharge end of alternate beater blades are shorter as indicated at 5 to facilitate a more uniform discharge of the dross material.

Structural details of the screen and its mounting and the means for driving the rotor, the frame work, the feed means and the discharge gate are all clearly shown and described in my co-pending application referred to so that they need not be repeated here, since as has been stated, this improvement has been added to the machine of the co-pending application.

What I claim as new and desire to secure by Letters Patent is:

1. An apparatus for treating fruit and vegetable mass materials to extract juice and the like therefrom comprising a screened drum member, a rotary member located within said drum member, means for rotating said rotary member, beater blades secured to said rotary member, arcuate faces on said beater blades adapted to move adjacent said drum member, the discharge ends of said beater blades being in staggered relation, and being adjustable radially and angularly relative to said drum.

2. An apparatus for treating fruit and vegetable mass material for extracting the juice and the like therefrom comprising a screened drum member, a rotary element within said drum member, beater blades on said rotary element and spaced substantially equidistant circumferentially, the faces of said blades describing the segment of a circle with one edge of the segment closer to said drum member than the other edge to engage mass material by a gradual compression and squeeze it against and through said screened drum member, said beater blades being adjustable radially and angularly relative to said drum.

HAROLD R. LEWIS.